United States Patent [19]
Senta

[11] Patent Number: 5,274,776
[45] Date of Patent: Dec. 28, 1993

[54] INFORMATION PROCESSING SYSTEM HAVING MODE SIGNAL HOLDING MEANS AND SELECTING OPERAND ACCESS MODE BASED ON MODE SIGNAL INDICATING TYPE OF CURRENTLY EXECUTED INSTRUCTION

[75] Inventor: Tetsuhide Senta, Tokyo, Japan

[73] Assignee: NEC Corporation, Tokyo, Japan

[21] Appl. No.: 651,532

[22] Filed: Feb. 6, 1991

[30] Foreign Application Priority Data

Feb. 8, 1990 [JP] Japan ............................ 2-30130

[51] Int. Cl.$^5$ ...................... G06F 9/34; G06F 12/00
[52] U.S. Cl. ........................... 395/375; 395/425; 364/232.9; 364/254.8; 364/246; 364/DIG. 1
[58] Field of Search ............... 395/375, 400, 425, 800

[56] References Cited

U.S. PATENT DOCUMENTS

| | | | |
|---|---|---|---|
| 4,736,289 | 4/1988 | Eaton | 395/375 |
| 4,782,443 | 11/1988 | Matsumoto | 395/400 |
| 4,928,237 | 5/1990 | Bealkowski et al. | 395/500 |
| 5,001,627 | 3/1991 | Sakamoto | 395/375 |
| 5,038,280 | 8/1991 | Watanabe et al. | 395/725 |
| 5,142,630 | 8/1992 | Ishikawa | 395/375 |

Primary Examiner—Thomas C. Lee
Assistant Examiner—Alpesh M. Shah
Attorney, Agent, or Firm—Foley & Lardner

[57] ABSTRACT

In an information processing system including an operand accessing unit for accessing a main memory to read an operand for a current instruction, the operand accessing unit comprises a mode flip-flop for holding a mode signal in response to a decoded signal supplied from an instruction analyzing memory. The mode signal indicates that whether or not a particular one of instructions of a second kind is executed by an executing unit as the current instruction. Connected to a control storage unit, a memory access mode register holds a memory access mode bit indicative of a memory access mode which defines an access mode for the main memory. The memory access mode bit is renewed by a processed signal supplied from the control storage unit. A predetermined access mode register holds a predetermined access mode bit indicative of a predetermined access mode. Connected to the mode flip-flop, the memory access mode register, and the predetermined access mode register, an access mode selector selects one of the memory access mode bit and the predetermined access mode bit as a selected access mode bit indicative of a selected access mode. Connected to the access mode selector, an instruction fetching unit, and the main memory, an operand fetching unit fetches the operand in accordance with the selected access mode indicated by the selected access mode bit.

2 Claims, 3 Drawing Sheets

INFORMATION PROCESSING SYSTEM HAVING MODE SIGNAL HOLDING MEANS AND SELECTING OPERAND ACCESS MODE BASED ON MODE SIGNAL INDICATING TYPE OF CURRENTLY EXECUTED INSTRUCTION

BACKGROUND OF THE INVENTION

This invention relates to an information processing system operable according to a software program which defines instructions of a first and second kind.

In a manner known in the art, an information processing system is operable according to a microprogram which is memorized in a control storage and which defines a plurality of microinstructions. Each of the microinstructions is divided into a plurality of fields. The microinstructions are classified into horizontal microinstructions and vertical microinstructions. Each of the horizontal microinstructions is divided into many fields and consists of a large number of bits. On the other hand, each of the vertical microinstructions is divided into a few fields and consists of a small number of bits in comparison with those of the horizontal microinstructions. Therefore, the horizontal microinstructions are adopted in the information processing system rather than the vertical ones in order to raise processing performance in the information processing system. This is because the information processing system carries out several functions in one step or one machine cycle by adopting the microprogram which defines the horizontal microinstructions. More specifically, hardware of the information processing system is optimized so as to make the most of the characteristics of the horizontal microinstructions for instructions which are frequently used, such as basic operation instructions. Under the circumstances, the information processing system comprises a control storage unit, including a control storage implemented by a few IC memory chips.

However, sequential processing is carried out by the information processing system on many other instructions such as various control instructions, list processing instructions for repeatedly handling data in a main memory, and the like. When the information processing system carries out such sequential processing by adopting the microprogram which defines the horizontal microinstructions, a few fields are used in the fields of each horizontal microinstruction. This is because the information processing system only carries out one small function at one step, despite many other instructions. As a result, the control storage is hardly available in a word direction or in a longitudinal direction for each horizontal microinstruction.

In order to resolve such a defect, the information processing system realizes the other instructions such as the various control instructions by adopting an instruction program which defines the basic operation instructions realized by the microprogram. More specifically, the basic operation instructions are referred to as instructions of a first kind. The other instructions, such as the various control instructions, are called instructions of a second kind. In other words, each of the instructions of the first kind is realized by the microprogram. Each of the instructions of the second kind is realized by the instruction program. The information processing system is operable according to a software program which defines the instructions of the first kind and the instructions of the second kind.

Such an information processing system comprises a main memory for memorizing the instructions of the first kind and the instructions of the second kind. The main memory is connected to an instruction fetching unit for successively fetching, as a current instruction, each of the instructions of the first kind and the instructions of the second kind. The instruction fetching unit is connected to an instruction analyzing memory which acts as an instruction decoding arrangement for decoding the current instruction into a decoded signal. The instruction analyzing memory is connected to a control storage unit which serves as a microinstruction processing arrangement for successively processing the microinstructions to produce a processed signal in response to each of the microinstructions. The main memory, the instruction fetching unit, and the control storage unit are connected to an operand accessing unit for accessing the main memory in response to the processed signal to read an operand for the current instruction. The operand accessing unit, the instruction analyzing memory, and the control storage unit are connected to an executing unit for executing the current instruction on the operand in response to the decoded signal and the processed signal.

In a conventional information processing system, the operand accessing unit comprises a memory access mode register connected to the control storage unit for holding a memory access mode bit indicative of a memory access mode which defines an access mode for the main memory. The memory access mode bit is renewed by the processed signal. The memory access mode register, the instruction fetching unit, and the main memory are connected to an operand fetching unit for fetching the operand in accordance with the memory access mode indicated by the memory access mode bit. In the conventional information processing system, the contents of the memory access mode register must be read and stored in a specific register on starting the processing of the instruction program, in order to keep the state before the software program is branched to the instruction program. Then, the stored contents must be set in the memory access mode register on closing the processing of the instruction program. Therefore, the conventional information processing system is disadvantageous in that if suffers from more overhead during starting and closing processing of the instruction program.

SUMMARY OF THE INVENTION

It is an object of this invention to provide an information processing system which is operable with little overhead during starting and closing processing of the instruction program.

Other objects of this invention will become clear as the description proceeds.

On describing the gist of this invention, it is possible to understand that an information processing system is operable according to a software program which defines instructions of a first kind and instructions of a second kind. Each of the instructions of the first kind is realized by a microprogram which defines a plurality of microinstructions. Each of the instructions of the second kind is realized by an instruction program which defines the instructions of the first kind. The information processing system comprises a main memory for memorizing instructions of the first kind and instructions of the second kind. Connected to the main memory, a instruction fetching means successively fetches, as a current instruction, each of the instructions of the first kind and the instructions of the second kind. Connected to the instruction fetching means, instruction decoding means decodes the current instruction into a decoded signal. Connected to the instruction decoding means, a microinstruction processing means successively processes the microinstructions to produce a processed signal in response to each of the microinstructions. Connected to the main memory, the instruction fetching means and the microinstruction processing means, an operand accessing means accesses the main memory in response to the processed signal to read an operand for the current instruction. Connected to the instruction decoding means, the microinstruction processing means, and the operand accessing means, an executing unit executes the current instruction on the operand in response to the decoded signal and the processed signal.

According to an aspect of this invention, the above-understood operand accessing means comprises mode holding means connected to the instruction decoding means for holding a mode signal in response to the decoded signal. The mode signal indicates that whether or not one of the instructions of the second kind is executed by the executing unit as the current instruction. Connected to the microinstruction processing means, a memory access mode register holds a memory access mode bit indicative of a memory access mode which defines an access mode for the main memory. The memory access mode bit is renewed by the processed signal. A predetermined access mode register holds a predetermined access mode bit indicative of a predetermined access mode. Connected to the mode holding means, to the memory access mode register, and to the predetermined access mode register, access mode selecting means selects a particular one of the memory access mode bit and the predetermined access mode bit as a selected access mode bit indicative of a selected access mode. The access mode selecting means produces the memory access mode bit as the selected access mode bit when the mode signal indicates that particular one of the instructions of the second kind is not executed by the executing unit. The access mode selecting means produces the predetermined access mode bit as the selected access mode bit when the mode signal indicates that the particular one of the instructions of the second kind is executed by the executing unit. Connected to the access mode selecting means, to the instruction fetching means, and to the main memory, an operand fetching means fetches the operand in accordance with the selected access mode indicated by the selected access mode bit.

DESCRIPTION OF THE PREFERRED EMBODIMENT

Figure 1:
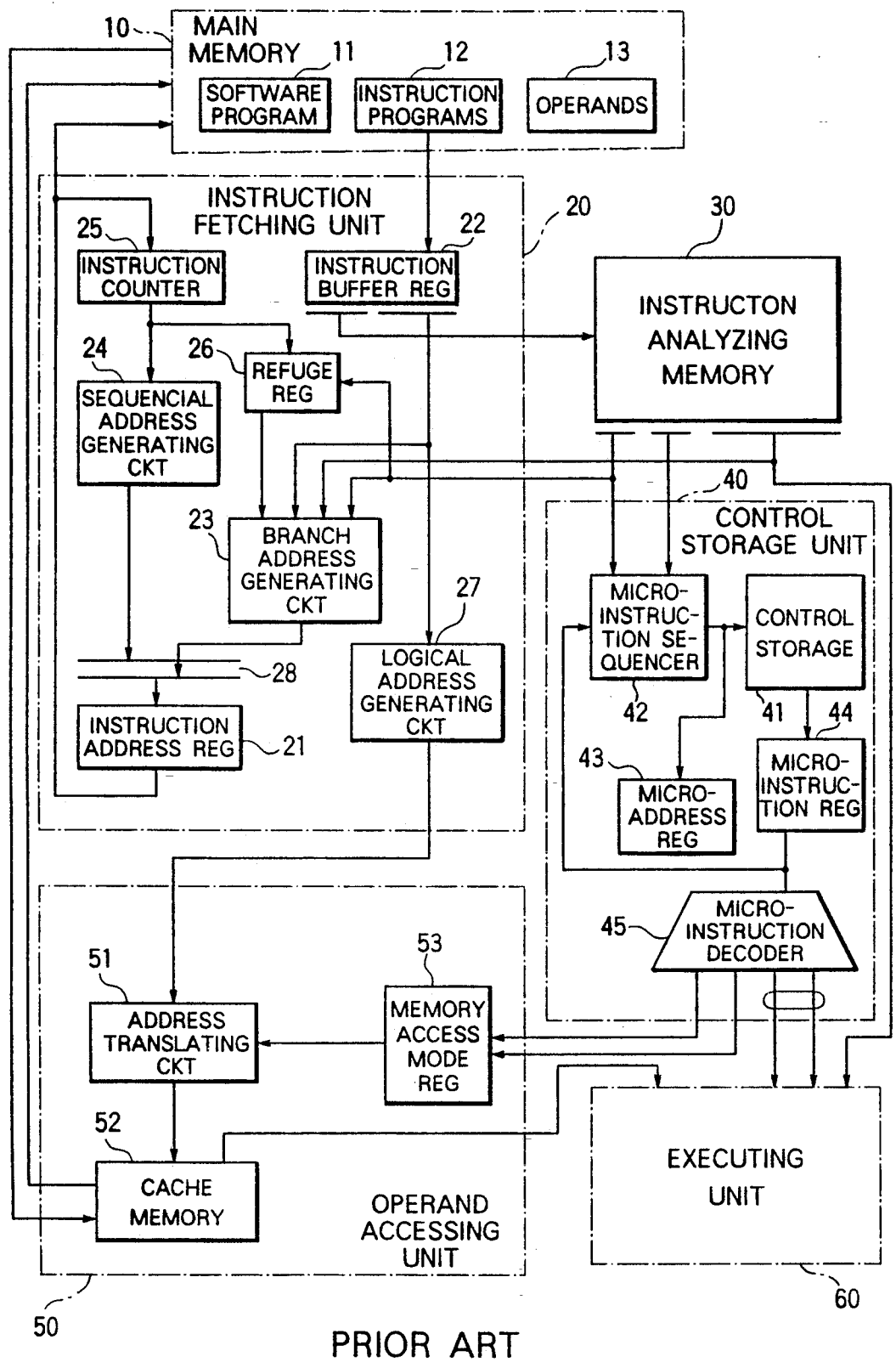
FIG. 1 is a block diagram of a conventional information processing system.

Referring to FIG. 1, description will be made at first as regards a conventional information processing system, in order to facilitate an understanding of the invention.

The conventional information processing system comprises a main memory 10, an instruction fetching unit 20, an instruction analyzing memory 30, a control storage unit 40, an operand accessing unit 50, and an executing unit 60.

The conventional information processing system is operable according to a software program which defines an instruction of a first kind and an instruction of a second kind. Each of the instructions of the first kind is realized by a microprogram. Each of the instructions of the second kind is realized by an instruction program which defines the instructions of the first kind. The instructions of the first kind are, for example, basic operation instructions. The instructions of the second kind are many other instructions, such as various control instructions, list processing instructions, and the like.

The main memory 10 memorizes the software program depicted at 11, a plurality of instruction programs 12, and data or operands 13 for the software program 11. That is, the main memory 10 memorizes the instructions of the first kind and the instructions of the second kind. The main memory 10 is connected to the instruction fetching unit 20.

The instruction fetching unit 20 successively fetches, as a current instruction, each of the instructions of the first kind and the instructions of the second kind. More specifically, the instruction fetching unit 20 comprises an instruction address register 21, an instruction buffer register 22, a branch address generating circuit 23, a sequential address generating circuit 24, an instruction counter 25, a refuge register 26, a logical address generating circuit 27, and an address selector 28.

The instruction address register 21 holds an instruction address. Each of the instructions of the software program 11 is read from the main memory 10 according to the instruction address held in the instruction address register 21 and then is stored in the instruction buffer register 22 as the current instruction. In other words, each of the instructions of the software program 11 is prefetched in the instruction buffer register 22 as the current instruction prior to execution by the executing unit 60 of the current instruction.

The current instruction is divided into an instruction code part and an operand part. The instruction code part of the current instruction is supplied to the instruction analyzing memory 30. The operand part of the current instruction is supplied to the branch address generating circuit 23 and the logical address generating circuit 27.

The instruction address is supplied to the instruction counter 25 from the instruction address register 21. Supplied with the instruction address, the instruction counter 25 counts an address to produce a counted address. The counted address is supplied to the sequential address generating circuit 24 and the refuge register 26. Supplied with the counted address, the sequential address generating circuit 24 generates a sequential address. In the manner which will later become clear, the refuge register 26 holds the counted address as a refuge address. The refuge address is supplied to the branch address generating circuit 23. In the manner which will later become clear, the branch address generating circuit 23 generates a branch address. The sequential address and the branch address are supplied to the address selector 28. The address selector 28 selects one of the sequential address and the branch address as a selected address. The selected address is supplied to the instruction address register 21.

The operand part of the current instruction is supplied to the logical address generating circuit 27. Supplied with the operand part of the current instruction, the logical address generating circuit 27 generates a logical address. More particularly, the operand part of the current instruction indicates a base address, an index address, and a displacement. The logical address generating circuit 27 calculates a three-term sum of the base address plus the index address plus the displacement to produce the three-term sum as the logical address. The logical address is supplied to the operand accessing unit 50.

The instruction fetching unit 20 is connected to the instruction analyzing memory 30. Supplied with the instruction code part of the current instruction, the instruction analyzing memory 30 produces a decoded signal. That is, the instruction analyzing memory 30 acts as an instruction decoding arrangement for decoding the current instruction into the decoded signal.

The decoded signal is supplied to the instruction fetching unit 20, the control storage unit 40, and the executing unit 60. More particularly, the decoded signal is divided into first through third partial decoded signals. The first partial decoded signal indicates a starting address for the microprogram. The second partial decoded signal indicates whether the current instruction is either the instruction of the first kind or the instruction of the second kind. When the current instruction is the instruction of the first kind, the second partial decoded signal has a logic zero value. When the current instruction is the instruction of the second kind, the second partial decoded signal has a logic one value. The second partial decoded signal furthermore indicates whether or not the counted address should be stored in the refuge register 26 as the refuge address. The third partial decoded signal indicates a starting address for the instruction program. The first partial decoded signal is supplied to the control storage unit 40. The second partial decoded signal is supplied to the instruction fetching unit 20 and the control storage unit 40. The third partial decoded signal is supplied to the instruction fetching unit 20 and the executing unit 60.

The instruction analyzing memory 30 is connected to the control storage unit 40. The control storage unit 40 serves as a microinstruction processing arrangement for successively processing the microinstructions to produce a processed signal in response to each of the microinstructions.

More specifically, the control storage unit 40 comprises a control storage 41, a microinstruction sequencer 42, a microaddress register 43, a microinstruction register 44, and a microinstruction decoder 45.

The control storage 41 memorizes the microprogram. The microinstruction sequencer 42 is supplied with the first and the second partial decoded signals. When the second partial decoded signal indicates that the current instruction is of the first kind, the microinstruction sequencer 42 accesses the control storage 41 according to the starting address indicated by the first partial decoded signal to read as a read microinstruction a microinstruction indicated by the starting address. The read microinstruction is held in the microinstruction register 44 as a held microinstruction. The held microinstruction includes information indicative of detection of an address for a next succeeding microinstruction or indicative of the address for the next succeeding microinstruction. The held microinstruction is supplied to the microinstruction sequencer 42 and the microinstruction decoder 45. The microinstruction decoder 45 decodes the held microinstruction into a micro-decoded signal. The micro-decoded signal is delivered to the operand accessing unit 50 and the executing unit 60 as the processed signal. The microaddress register 43 holds the address for the microinstruction that is supplied from the microinstruction sequencer 42.

The main memory 10, the instruction fetching unit 20, and the control storage unit 40 are connected to the operand accessing unit 50 for accessing the main memory 10 in response to the processed signal to read an operand for the current instruction.

More particularly, the operand accessing unit 50 comprises an address translating circuit 51, a cache memory 52, and a memory access mode register 53. The memory access mode register 53 is connected to the control storage unit 40 for holding a memory access mode bit indicative of a memory access mode which defines an access mode for the main memory 10. The memory access mode bit is renewed by the processed signal. The memory access mode register 53 and the instruction fetching unit 20 are connected to the address translating circuit 51. Supplied with the logical address, the address translating circuit 51 translates the logical address into a physical address in accordance with the memory access mode indicated by the memory access mode bit. The physical address is sent to the cache memory 52. The cache memory 52 keeps a copy of a portion of the operands 13 which are kept in the main memory 10. In the manner known in the art, the cache memory 52 is controlled by a least recently used (LRU) method. When the cache memory 52 keeps a specific one of the operands that is indicated by the physical address, the cache memory 52 supplies the specific operand to the executing unit 60. Otherwise, the cache memory 52 delivers the physical address to the main memory 10 to read the specific operand from the main memory 10 as a read operand. The read operand is supplied to the executing unit 60 through the cache memory 52. At any rate, a combination of the address translating circuit 51 and the cache memory 52 serves as an operand fetching unit for fetching the operand in accordance with the memory access mode indicated by the memory access mode bit.

The operand accessing unit 50, the instruction analyzing memory 30, and the control storage unit 40 are connected to the executing unit 60. Supplied with the operand, the processed signal, and the third partial decoded signal, the executing unit 60 executes the current instruction on the operand in response to the third partial decoded signal and the processed signal.

In addition, the memory access mode is typically either a segment mode or a physical address mode. When the memory access mode is a segment mode, the address translating circuit 51 translates the logical address into the physical address to supply the physical address to the cache memory 52. When the memory access mode is the physical address mode, the address translating circuit 51 supplies the logical address as the physical address to the cache memory 52 without address translation. Under the circumstances, it is possible to directly access the main memory 10 by the logical address which is indicated by the software program 11. The software program may include a software instruction for renewing the memory access mode bit. This is because the memory access mode register 53 is controlled by the control storage unit 40.

Figure 2:
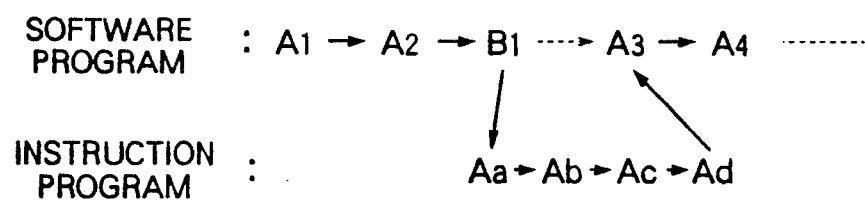
FIG. 2 is an example of a software program, together with an instruction program stored in a main memory, for use in the information processing system illustrated in FIG. 1.

Turning to FIG. 2, the main memory 10 is loaded with the software program 11 as indicated along a first or top line of FIG. 2. As mentioned above, the software program 11 (FIG. 1) defines the instructions of the first kind and the instructions of the second kind. In the software program 11, the instructions of the first kind are depicted at A1, A2, A3, and A4. A particular one of the instructions of the second kind is depicted at B1. The particular instruction of the second kind B1 is realized by a specific one of the instruction programs 12 (FIG. 1) in the manner indicated along a second or bottom line. The specific instruction program defines the instructions of the first kind which are depicted at Aa, Ab, Ac, and Ad.

Description will be made as regards operation of the conventional information processing system shown in FIG. 1 with reference to the software program 11 illustrated in FIG. 2.

The software program 11 is processed along a direction indicated by arrows in FIG. 2. The instruction of the first kind A1 is at first stored in the instruction buffer register 22 as the current instruction. The instruction code part of the current instruction A1 is supplied to the instruction analyzing memory 30. Responsive to the instruction code part of the current instruction A1, the instruction analyzing memory 30 produces the decoded signal. The first and the second partial decoded signals of the decoded signal are supplied to the control storage unit 40. Inasmuch as the current instruction A1 is the instruction of the first kind, the microinstruction sequencer 42 accesses the control storage 41 by using the first partial decoded signal to read the microinstruction as the read microinstruction. The read microinstruction is held in the microinstruction register 44 as the held microinstruction. Supplied with held microinstruction, the microinstruction decoder 45 decodes the held microinstruction into the processed signal. The held microinstruction is supplied to the microinstruction sequencer 42 to read the next succeeding microinstruction from the control storage 41. Therefore, the microinstructions are sequentially carried out.

Subsequently, the instruction of the first kind A2 is stored in the instruction buffer register 22 as the current instruction. This current instruction A2 is processed in a manner similar to the manner described for instruction of the first kind A1.

Subsequently, the instruction of the second kind B1 is stored in the instruction buffer register 22 as the current instruction. The instruction code part of the current instruction B1 is supplied to the instruction analyzing memory 30. Responsive to the instruction code part of the current instruction B1, the instruction analyzing memory 30 produces the decoded signal. The first and the second partial decoded signals of the decoded signal are supplied to the control storage unit 40. Simultaneously, the second partial decoded signal is supplied to the refuge register 26 and the branch address generating circuit 23. Inasmuch as the current instruction B1 is the instruction of the second kind, the microinstruction sequencer 42 stops readout of the microinstruction from the control storage 41 to the microinstruction register 44. The microinstruction register 44 is loaded with a specific microinstruction which is called an NOP (no operation) instruction. Therefore, an arithmetic operation is temporarily interrupted.

Supplied with the second partial decoded signal, the branch address generating circuit 23 generates, as the starting address for the instruction program, the third partial decoded signal supplied from the instruction analyzing memory 30. The starting address for the instruction program is stored in the instruction address register 21 through the address selector 28. Responsive to the starting address for the instruction program, the main memory 10 produces a first one Aa of the instructions of the first kind for the specific instruction program. The instruction of the first kind Aa is stored in the instruction buffer register 22 as the current instruction. Responsive to the second partial decoded signal, the refuge register 26 is loaded with the counted address for the instruction of the second kind B1 as the refuge address.

Inasmuch as the current instruction Aa is instruction of the first kind, the current instruction Aa is processed as described in connection with the instruction of the first kind A1. The instruction buffer register 22 is successively loaded with a second and a third ones Ab and Ac of the instructions of the first kind. The instructions of the first kind Ab and Ac are likewise processed as described in conjunction with the instruction of the first kind A1.

Subsequently, a fourth or last one Ad of the instructions of the first kind is stored in the instruction buffer register 22 as the current instruction. The current instruction Ad plays a role of returning to a next instruction of the first kind A3 for the software program 11.

More specifically, the current instruction Ad is defined as a relative branch instruction based on the refuge address which is held in the refuge address. Supplied with the refuge address and the operand part of the current instruction Ad, the branch address generating circuit 23 generates, as the branch address, an instruction address for the next instruction of the first kind A3. The branch address is held in the instruction address register 21. The next instruction of the first kind A3 is read from the main memory 10 and then held in the instruction buffer register 22 as the current instruction. Inasmuch as the current instruction A3 is the instruction of the first kind, the current instruction A3 is processed in a manner similar to that described in conjunction with the instruction of the first kind A1.

On carrying out a memory access for the main memory 10 as regards each of the instruction programs 12, the main memory 10 is generally accessed in accordance with the physical access mode. This is because the instruction programs 12 are memorized in an exclusive working area in the main memory 10 that is separated from that for the software program 11.

Therefore, the conventional information processing system is disadvantageous, as pointed out in the preamble of the instant specification.

Figure 3:
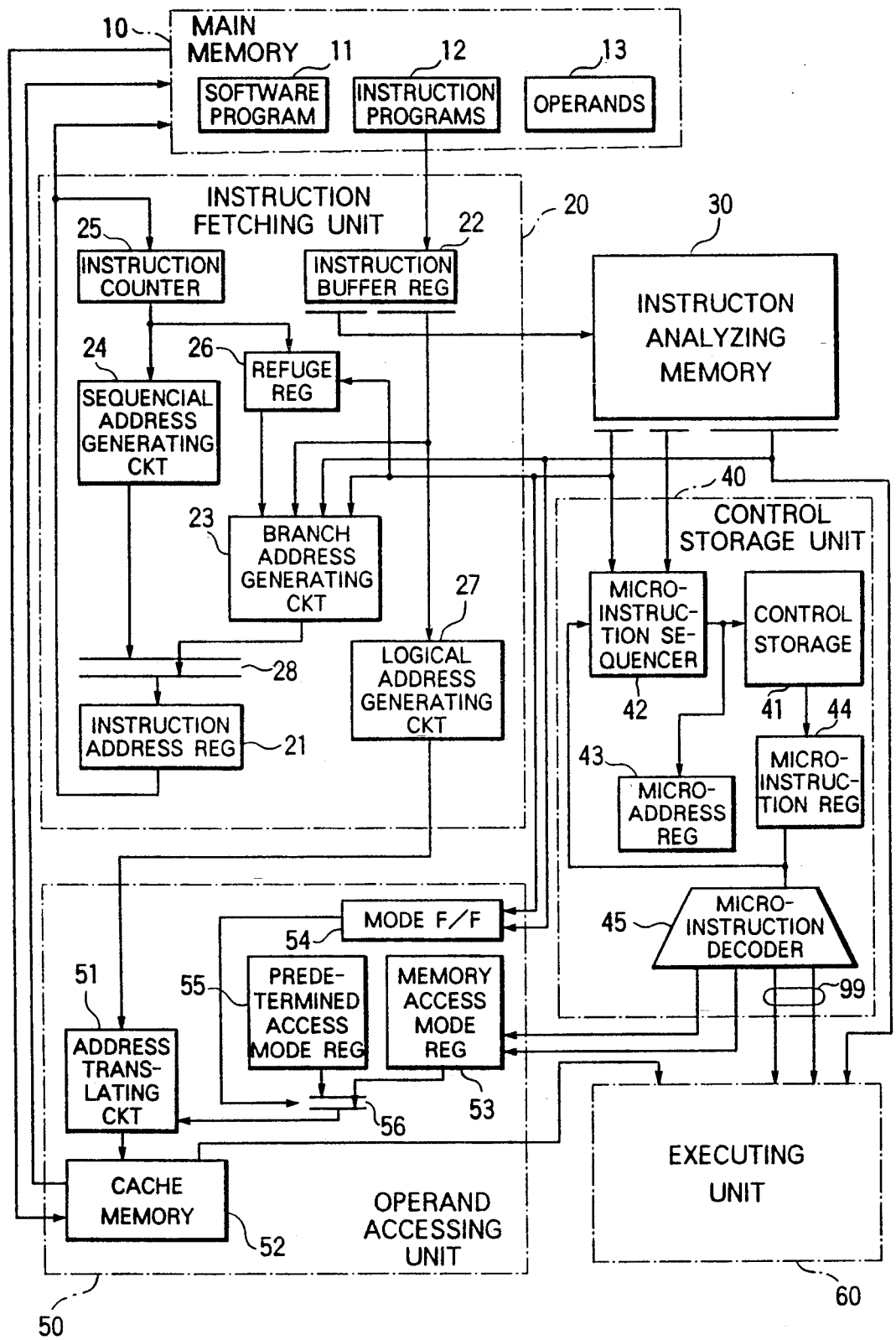
FIG. 3 is a block diagram of an information processing system according to an embodiment of this invention.

Referring to FIG. 3, an information processing system according to an embodiment of this invention comprises similar parts which are designated by like reference numerals and are operable like the conventional information processing system described with reference to FIG. 1. It should be noted that the operand accessing unit 50 further comprises a mode flip-flop 54, a predetermined access mode register 55, and an access mode selector 56.

The mode flip-flop 54 is connected to the instruction analyzing memory 30. The mode flip-flop 54 is supplied with the second and the third partial decoded signals from the instruction analyzing memory 30. Responsive to the second and the third partial decoded signals, the mode flip-flop 54 holds a mode signal. The mode signal indicates whether or not the instruction of the second kind B1 (FIG. 2) is executed by the executing unit 60 as the current instruction. More particularly, the mode flip-flop 54 is set by the mode signal of the logic one value in response to the second partial decoded signal on starting processing of the specific instruction program. Either on closing processing of the specific instruction program or when processing is made as regards the last instruction Ad (FIG. 2) of the first kind, the mode flip-flop 54 is reset by the mode signal of the logic zero value in response to the third partial decoded signal. That is, the mode flip-flop 54 holds the mode signal of the logic one value during execution of the specific instruction program.

The predetermined access mode register 55 holds a predetermined access mode bit indicative of a predetermined access mode. In the example being illustrated, the predetermined access mode is identical with the physical access mode. This is because the main memory 10 is accessed in accordance with the physical access mode during execution of the specific instruction program.

The access mode selector 56 is connected to the mode flip-flop 54, to the memory access mode register 53, to the predetermined access mode register 55, and to the address translating circuit 51. Responsive to the mode signal, the access mode selector 56 selects one of the memory access mode bits and the predetermined access mode bit as a selected access mode bit, which is indicative of a selected access mode. The access mode selector 56 supplies the memory access mode bit as the selected access mode bit to the address translating circuit 51 when the mode signal indicates that no instruction program is executed by the executing unit 60. The access mode selector 56 supplies the predetermined access mode bit as the selected access mode bit to the address translating circuit 51 when the mode signal indicates that the specific instruction program is executed by the executing unit 60.

The address translating circuit 51 translates the logical address into the physical address in accordance with the selected access mode indicated by the selected access mode bit.

What is claimed is:

1. In an information processing system operable according to a software program which defines instructions of a first and a second kind, each of the instructions of said first kind carried out by a microprogram which defines a plurality of microinstructions, each of the instructions of said second kind carried out by an instruction program which defines the instructions of said first kind, said information processing system comprising a main memory for memorizing the instructions of said first kind and said second kind, instruction decoding means connected to an instruction fetching means for decoding a current instruction into a decoded signal, microinstruction processing means connected to said instruction decoding means for successively processing said microinstructions to produce a processed signal in response to each of said microinstructions, operand accessing means connected to said main memory, said instruction fetching means, and said microinstruction processing means for accessing said main memory in response to said processed signal to read an operand for said current instruction, and an executing unit connected to said instruction decoding means, said microinstruction processing means, and said operand accessing means for executing said current instruction on said operand in response to said decoded signal and said processed signal, the improvement wherein said operand accessing means comprises:

mode holding means connected to said instruction decoding means for holding a mode signal in response to said decoded signal, said mode holding means being set when said decoded signal indicates that the processing of said instruction program has started, said mode holding means being reset when said decoded signal indicates that processing of said instruction program has stopped, said mode signal thereby indicating whether or not one of the instructions of said second kind is executed by said executing unit as said current instruction;

a memory access mode register connected to said microinstruction processing means for holding a memory access mode bit indicative of a memory access mode which defines an access mode for said main memory, said memory access mode register being controlled by said microinstruction processing means, said memory access mode bit thereby being renewed by said processed signal;

a predetermined access mode register for holding a predetermined access mode bit indicative of a predetermined access mode;

access mode selecting means connected to said mode holding means, to said memory access mode register, and to said predetermined access mode register for selecting one of said memory access mode bit and said predetermined access mode bit as a selected access mode bit indicative of a selected access mode, said access mode selecting means selecting said memory access mode bit as said selected access mode bit when said mode signal indicates that said one of the instructions of the second kind is not executed by said executing unit, said access mode selecting means selecting said predetermined access mode bit as said selected access mode bit when said mode signal indicates that said one of the instructions of the second kind is executed by said executing unit; and operand fetching means connected to said access mode selecting means, to said instruction fetching means, and to said main memory, for fetching said operand in accordance with the selected access mode indicated by said selected access mode bit.

2. An information processing system as claimed in claim 1, wherein said memory access mode is selected from a segment mode and a physical address mode, wherein said predetermined access mode register holds, as said predetermined access mode bit, a physical address mode bit indicative of said physical address mode.

* * * * *